United States Patent
Bennett

[15] 3,679,032
[45] July 25, 1972

[54] LOCKABLE OVERRUN DEVICE

[72] Inventor: John S. Bennett, Cirencester, England

[73] Assignees: Massey-Ferguson Services N.V.; Abraham de Veerstrost, Curacao, Netherlands Antilles

[22] Filed: Nov. 19, 1970

[21] Appl. No.: 90,919

[30] Foreign Application Priority Data

Dec. 4, 1969 Great Britain..................59,204/69

[52] U.S. Cl..........................192/46, 192/91 A, 192/114 R
[51] Int. Cl.................................F16d 41/00, F16d 11/00
[58] Field of Search..................192/46, 91 R, 91 A, 114 R

[56] References Cited

UNITED STATES PATENTS

| | | | |
|---|---|---|---|
| 1,240,334 | 9/1917 | Gilbertson | 192/114 X |
| 2,395,459 | 2/1946 | Carnagua | 192/91 A |
| 2,618,366 | 11/1952 | Bryant | 192/91 A X |
| 3,362,245 | 1/1968 | Francuch et al. | 192/114 X |
| 3,498,151 | 3/1970 | King | 192/46 X |

Primary Examiner—Allan D. Herrmann
Attorney—Gerhardt, Greenlee & Farris

[57] ABSTRACT

An overrun device comprises first and second drive members. The first drive member includes a plurality of ramped teeth engageable by similar teeth of a coupler mounted through helical splines to the second drive member. Engagement of these teeth in one direction causes a transmittal of the drive between the two members while driving in the opposite direction tends to separate the teeth because of the biasing effect of the helical splines. Another coupler is mounted on the second drive member for interlocking toothed engagement with the first coupler under the influence of a spring to disable the effect of the helical spline bias and retain engagement of the first set of teeth in either drive direction. Pressure fluid is utilized to disengage the second coupler and enable disengagement of the first set of teeth, effecting overrun.

11 Claims, 3 Drawing Figures

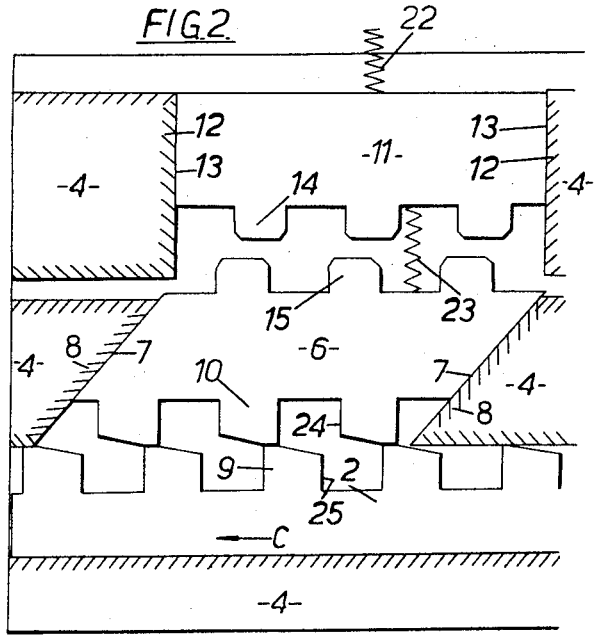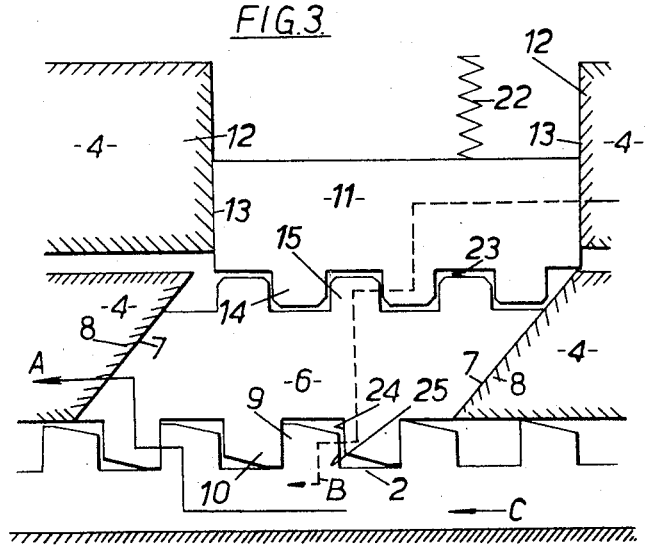

LOCKABLE OVERRUN DEVICE

This invention relates to an overrun device including means for selective locking thereof.

An object of the present invention is to provide such a device which is simple and inexpensive to produce.

According to the present invention there is provided a lockable overrun device for transmitting drive in a predetermined direction from a first member to a second member and for selectively transmitting drive in said direction from said second member to said first member, comprising a first coupler driveably connected to the first member, a second coupler engageable with the first coupler to transmit said drive from each to the other, biasing means adapted, when the drive is from said first coupler to said second coupler, to maintain said engagement and to transmit the drive to the second member and, when the drive is from said second coupler to said first coupler, to disengage said couplers from each other, a third coupler driveably connected to the second member and selectively engageable with said second coupler and operative when so engaged to override the biasing means, and thereby prevent disengagement of said first and second coupler, when said drive is from said second member to said first member.

Preferably, the first and second couplers are drivingly connectible through a one way, overrunning, jaw-type clutch and the biasing means comprises helical splines on the second member cooperating with corresponding splines on the second coupler and so angled as to disengage the first and second couplers against the force of first spring means which constantly urges the first and second couplers into engagement.

Preferably also, the third coupler is engageable with the second coupler by virtue of mutually presented teeth which are constituted by axially presented dogs, and the third coupler is drivingly connected to the second member by parallel splines along which it can move only axially.

The invention will now be described, by way of example, with reference to the accompanying drawings, in which:

FIGS. 2 and 3 are developed views of the teeth of the device shown in FIG. 1 and illustrate the operation of the device.

Figure 1:
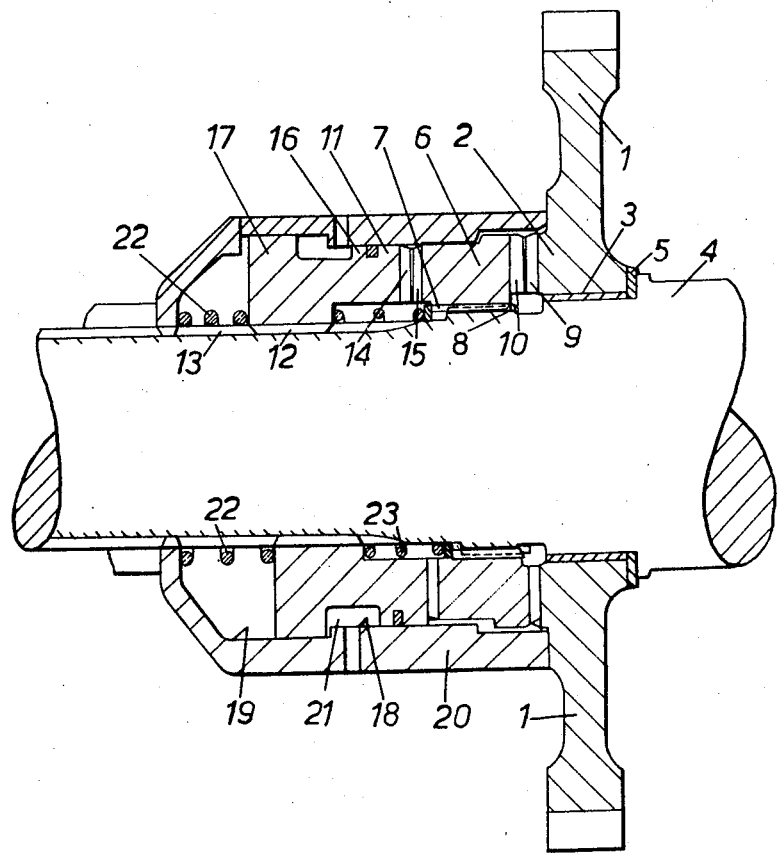
FIG. 1 is a cross sectional view through a device according to the invention, the upper half showing the unlocked position and the lower half the locked position.

Referring first to FIG. 1, a gear wheel or first member 1 adapted to be driven by a meshing gear wheel (not shown) is fast with a first or driving coupler 2 and both are journalled on a bearing 3 itself carried by a shaft 4 forming a second member. A thrust bearing 5 is also provided to receive axial thrust.

A second or driven coupler 6 is provided which is capable of axial and rotational movement relative to the shaft 4 by virtue of a set of helical splines 7 which are engaged with a set of complementary helical splines 8 on the shaft 4. The helical splines 7 and 8 form biasing means.

The engageable teeth between the driving and driven couplers 2 and 6 are in the form of a ring of axially presented jaws 9 and 10 which are bevelled on one face so that they are capable of overrunning each other, in one direction of relative rotation, by virtue of "kissing" contact between the bevels.

A third or control coupler 11 is mounted upon axially extending splines 12 and 13, on itself, and the shaft 4, respectively. The right hand end of the coupler 11, as seen in FIG. 1, is formed as an annular series of axially presented teeth 14 which are adapted to engage a similar series of teeth 15 formed on the left hand end, as seen in FIG. 1, of the driven coupler 6.

The remainder of the control coupler 11 is formed as a two diameter piston 16, 17 which is axially slidable in appropriate cylindrical inner surfaces 18 and 19 of a surrounding bell housing 20 which is splined to the shaft 4 at its left hand end, as seen in FIG. 1. A piston chamber 21 is contained between the two piston surfaces 16 and 17 and the housing 20.

A relatively heavy spring 22 constantly urges the control coupler 11 to the right and a relatively light spring 23 urges the control coupler 11 and driven coupler 6 apart.

Operation of the device will now be described by reference to FIGS. 2 and 3 in which the shaded boundary areas represent the shaft 4 in the form of helical splines 8 and axial splines 13, where indicated. The predetermined drive direction is indicated by arrow 'C'.

When the drive is in the drive direction it is clear that the double effect of the spring loading on the driven coupler 6 and the direction of its motion is such as to permit the jaws 9 and 10 to engage. When the jaws 9 and 10 are in engagement the spring loading on the control coupler 11 is such as to engage teeth 14 and 15.

When the jaws 9 and 10 are engaged and driving, the power path from the gear to the shaft is as shown diagrammatically in FIG. 3 as a heavy continuous line A. Thus, power passes from the drive gear, through the jaws 9 to the jaws 10 by face-to-face pressure and then from the helical splines 7 on the driven coupler to the helical splines 8 on the shaft. The reaction between the splines 7 and 8 tends to keep the jaws 9 and 10 in engagement with each other when the shaft is being driven.

When there is a reversal in the direction of power, i.e. the shaft 4 is exerting a driving force tending to maintain the direction of rotation, the power flow will be as shown in FIG. 3 by the heavy broken line B. The shaft 4 will cause splines 12 to rotate the control coupler 11 by using the splines 13. Thus, as seen in FIG. 3, the control coupler 11 will be moved to the left by the spline 12 on its right.

With teeth 14 and 15 in engagement drive will be transferred, by face-to-face pressure, to the teeth 15 and the coupler 6. The jaws 9 and 10 will move slightly to take up a predetermined clearance and make contact along their shorter axial sides 24 and 25, respectively. When these are in contact the drive is transmitted across them to the gear without there being any tendency for the jaws 9 and 10 to disengage. The reason that they do not disengage is that the coupler 6 is acting as a direct mechanical connection between the control coupler 11 and the coupler 2 and is merely "floating" on the helical splines 8. Thus, the helical splines carry no forces from the shaft 4 in the reversed drive condition and are effectively disabled as a biasing force. They may carry some slight force initially but the result of this is to move the control coupler 6 away from the coupler 2 by a very small amount just sufficient for the forces all to be transferred to the splines 12 and 13. Hence, in the overrun condition, the coupler 6 is fully floating on the splines 7 and 8.

When it is desired to permit the driven coupler 6 to overrun the driving coupler 2 the control coupler 11 is withdrawn, in the present embodiment, by pressurizing the chamber 21 with high pressure fluid so that the pressure acting over the area differential between pistons 16 and 17 will overcome the spring 22 and move the teeth 14 and 15 out of engagement.

What is claimed is:

1. A lockable overrun device for transmitting drive in a predetermined direction from a first member to a second member and for selectively transmitting drive in said direction from said second member to said first member, comprising a first coupler driveably connected to the first member, a second coupler engageable with the first coupler to transmit said drive from each to the other, biasing means adapted, when the drive is from said first coupler to said second coupler, to maintain said engagement and to transmit the drive to the second member and, when the drive is from said second coupler to said first coupler, to disengage said couplers from each other, a third coupler driveably connected to the second member and selectively engageable with said second coupler and operative when so engaged to disable the biasing means, and thereby prevent disengagement of said first and second coupler, when said drive is from said second member to said first member.

2. A device according to claim 1, in which the first and second couplers are drivingly connectible through a one way overrunning jaw-type clutch.

3. A device according to claim 2, in which the biasing means comprise helical splines on the second member co-operating with corresponding splines on the second coupler and so angled as to disengage the first and second couplers against the force of first spring means which constantly urge the first and second couplers into engagement.

4. A device according to claim 3, in which the third coupler is engageable with the second coupler by virtue of mutually presented teeth which are constituted by axially presented dogs.

5. A device according to claim 4, in which the third coupler is drivingly connected to the second member by parallel splines along which it can move only axially.

6. A device according to claim 5, in which said third coupler is hydraulically moveable along said splines so as to disengage from the second coupler through said teeth.

7. A device according to claim 2, in which the teeth of said jaw clutch are bevelled to facilitate overrunning in one direction.

8. A device according to claim 2, in which said first member is rotatably mounted on said second member.

9. A device according to claim 8, in which said first member is a gear wheel and said second member is a shaft.

10. A device according to claim 9, in which the first, second and third couplers are contained within a bell housing.

11. A device according to claim 2 in which a predetermined clearance is provided between adjacent engaging teeth of said jaw clutch.

* * * * *